United States Patent [19]

Westbrock et al.

[11] Patent Number: 4,678,876
[45] Date of Patent: Jul. 7, 1987

[54] ISOLATING SWITCH APPARATUS FOR A HIGH-VOLTAGE SWITCHING SYSTEM WHICH MAY BE INSULATED WITH $SF_6$ GAS

[75] Inventors: Paul Westbrock, Gelnhausen-Meerholz; Theo Peitz, Hanau, both of Fed. Rep. of Germany

[73] Assignee: BBC Aktiengesellschaft Brown, Boveri & Cie., Baden, Switzerland

[21] Appl. No.: 619,070

[22] Filed: Jun. 11, 1984

[30] Foreign Application Priority Data

Jun. 11, 1983 [DE] Fed. Rep. of Germany ....... 3321146

[51] Int. Cl.⁴ ............................................. H01H 33/60
[52] U.S. Cl. ............................ 200/148 R; 200/148 B; 200/148 H
[58] Field of Search ............ 200/148 R, 148 H, 148 B

[56] References Cited

U.S. PATENT DOCUMENTS 4,389,553   6/1983   Konig et al. .................... 200/148 H

FOREIGN PATENT DOCUMENTS 1465380   4/1969   Fed. Rep. of Germany .
2924630   1/1981   Fed. Rep. of Germany .

Primary Examiner—Robert S. Macon
Attorney, Agent, or Firm—Herbert L. Lerner; Laurence A. Greenberg

[57] ABSTRACT

An isolating switch apparatus, includes an encapsulation having at least one disconnection point and a plurality of contact points corresponding to a given number of phases therein, a plurality of phase conductors at least partially disposed in the encapsulation for a plurality of phases, first and second connection pieces connected to the phase conductors in the encapsulation for each contact point of each phase, the first and second connection pieces being partially overlapped, mutually spaced apart and substantially mutually parallel, a contact piece disposed on the second connection piece, an insulated drive shaft passing through a hole formed through the first connection piece, the drive shaft being overlapped by the second connection piece, and a contact blade attached to and rotatable by the drive shaft into a switched-on position in which the contact blade is substantially perpendicular to the first and second connection pieces, is disposed between the first and second connection pieces, and contacts the contact piece.

14 Claims, 14 Drawing Figures

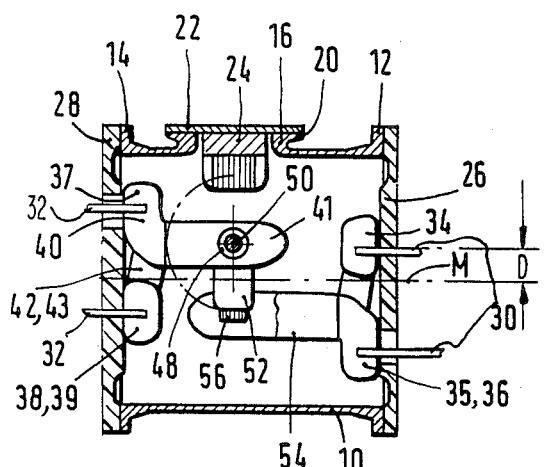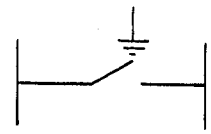
Fig.1
Fig.1a
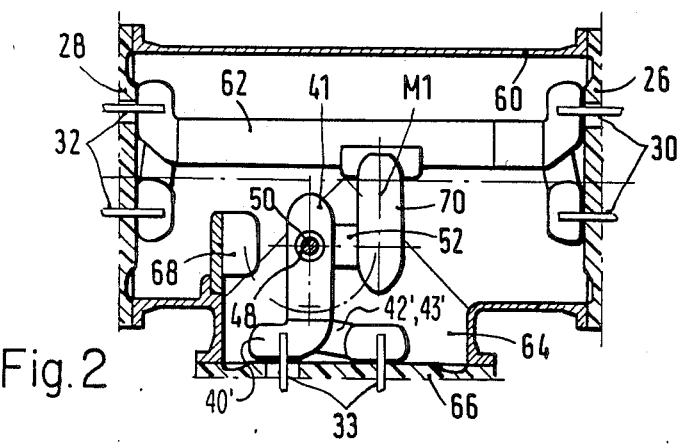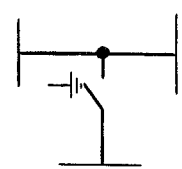
Fig.2
Fig.2a
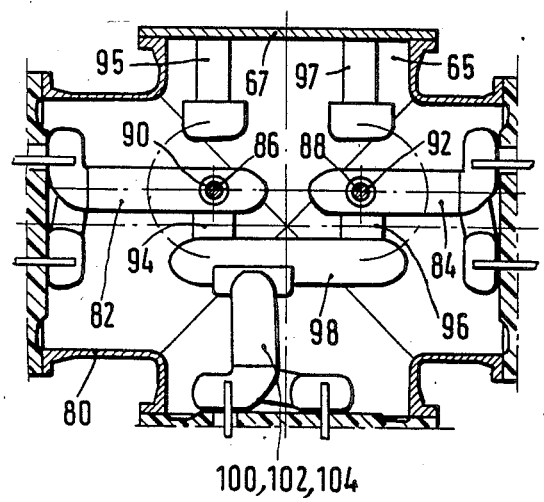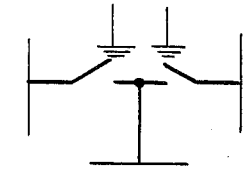
Fig.3
Fig.3a

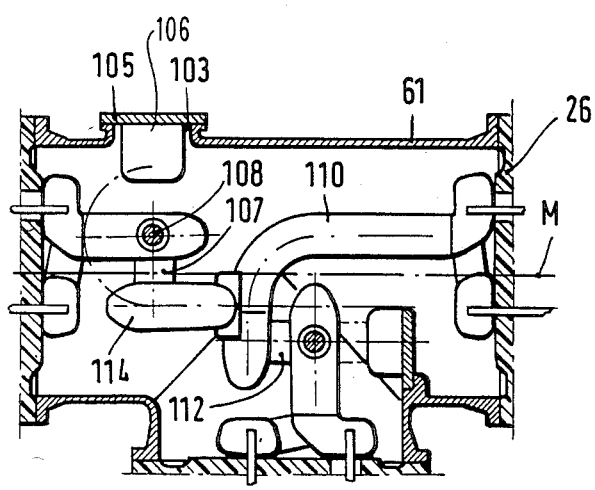
Fig. 4
Fig. 4a
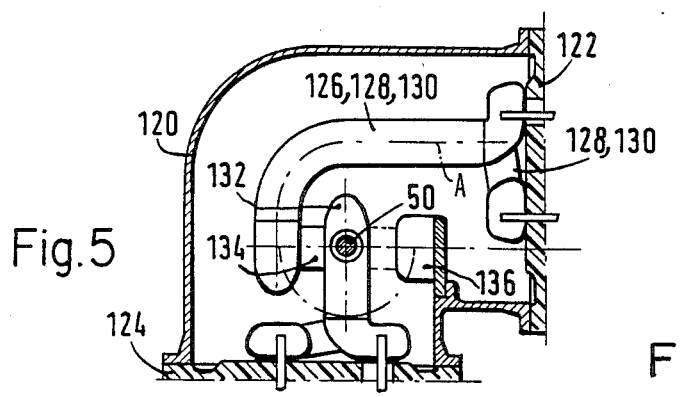
Fig. 5
Fig. 5a
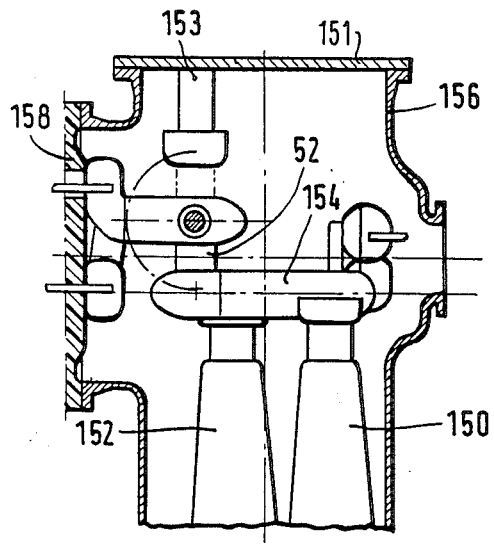
Fig. 6
Fig. 6a

ISOLATING SWITCH APPARATUS FOR A HIGH-VOLTAGE SWITCHING SYSTEM WHICH MAY BE INSULATED WITH SF$_6$ GAS

The invention relates to an isolating switch apparatus, enclosed by an encapsulation for a SF$_6$ gas-insulated high-voltage switching system, having at least one disconnection point with a plurality of contact points corresponding to the number of phase conductors, contact blades, and opposing contact pieces driven by an insulating drive shaft.

Isolating switch apparatus of the type mentioned above, in which the individual contact points are provided with rotatable contact blades, are known in the art (see German Published, Non-Prosecuted Application DE-OS No. 14 65 380 for single-phase encapsulated isolating switches). In the case of three-phase systems, the contact blades are disposed next to each other in the encapsulation on a drive shaft formed of a insulating material and referred to as an insulating shaft for short (see German Published, Non-Prosecuted Application DE-OS No. 29 24 630); other variations have not become known. In all these arrangements, the contact blades run approximately in alignment with the phase conductors when switched on. This affects the length and size of the construction and the number of variations is limited.

It is accordingly an object of the invention to provide an isolating switch apparatus which overcomes the hereinafter-mentioned disadvantages of the heretofore-known devices of this general type, which can be constructed in the most varied manner, and in which, in principle, the same components can always be used.

With the foregoing and other objects in view there is provided, in accordance with the invention, an isolating switch apparatus, comprising an encapsulation for a high-voltage switching system having at least one disconnection point and a plurality of contact points corresponding to a given number of phases therein, a plurality of phase conductors at least partially disposed in the encapsulation for a plurality of phases, first and second connection pieces connected to the phase conductors in the encapsulation for each contact point of each phase, the first and second connection pieces being partially overlapped, mutually spaced apart and substantially mutually parallel, a contact piece disposed on the second connection piece, an insulated drive shaft passing through a hole formed through the first connection piece, the drive shaft being overlapped by the second connection piece, and a contact blade attached to and rotatable by the drive shaft into a switched-on position in which the contact blade is substantially perpendicular to the first and second connection pieces, is disposed between the first and second connection pieces, and contacts the contact piece.

In accordance with another feature of the invention, there is provided SF$_6$ insulating gas disposed in the encapsulation.

In accordance with a further feature of the invention, the contact piece is disposed a given distance from the drive along an imaginary line, and including a grounding contact disposed on the encapsulation along the imaginary line at substantially the given distance from the drive shaft.

In accordance with an added feature of the invention, the first and second connection pieces are substantially symmetrically disposed on two sides of the central axis of the encapsulation or with respect to the phase conductors.

In accordance with an additional feature of the invention, the phase conductors include two substantially mutually aligned phase conductor arrangements and a third phase conductor arrangement substantially perpendicular to the two phase conductor arrangements, the disconnection point being associated with the third phase conductor, and including a connecting conductor connected between the two phase conductors, the second connection piece being connected to the connecting conductor.

In accordance with again another feature of the invention, the phase conductors are in the form of two mutually aligned and opposite phase conductor arrangements and a third phase conductor arrangement perpendicular to the two mutually aligned phase conductor arrangements, the at least one disconnection point being two disconnection points associated with the two phase conductors, the second connection piece for each of the two phase conductors overlapping the first connection pieces, and including another connection part associated with the third phase conductor and connected to the second connection pieces.

In accordance with again a further feature of the invention, the phase conductors are in the form of first and second mutually aligned and opposite phase conductor arrangements and a third phase conductor arrangement perpendicular to the first and second phase conductor arrangements, the at least one disconnection point being two disconnection points associated with the first and third phase conductors, the second connection piece of the third phase conductor being a substantially L-shaped conductor portion integral with the second phase conductor, and the second connection piece of the first phase conductor being attached to the second connection piece of the third phase conductor.

In accordance with again an added feature of the invention, the housing has a substantially 90° bend formed therein, the phase conductors include two mutually perpendicular phase conductor arrangements, and including a conductor portion bent through substantially 90°; the second connection piece of one of the phase conductors being integral with the end of the 90°-bent conductor portion.

In accordance with again an additional feature of the invention, there is provided a cable tap device perpendicular to one of the phase conductors having cables entering the encapsulation, the second connection piece being perpendicular to and attached to the cables.

In accordance with yet another feature of the invention, the contact blade has shaped pins integral with two sides thereof, the drive shaft is divided, and the pins are engaged in shaped recesses formed in the drive shaft matching the pins.

In accordance with yet a further feature of the invention, there is provided an annular collar surrounding the pins and having an outer surface forming a roller, and sliding contacts carrying the roller in a recess formed in the first connection piece.

In accordance with a concomitant feature of the invention, the divided drive shaft has two parts, the shaped recesses are formed in ends of the divided drive shaft, and including shielding elements embedded in the parts of the drive shaft aurrounding the shaped receses.

According to the invention, each contact point thus has two connection pieces at the phase conductors disposed at a distance from each other, overlapping each other and arranged parallel to each other, one connection piece carrying the insulating shaft with the contact blades and the other connection piece carrying the opposing contact piece. When the contact blade is in the switched-on position, the two connection pieces, which are opposite each other, are overlapped by the contact blade which runs perpendicular to both of them. If, in addition, a grounding contact is also to be provided, the grounding contact will be situated along the extension of the connecting line between the drive shaft and the opposite contact on the opposite side, in such a manner that the contact blade only has to rotate through 180° from the switched-on position through the switched-off position into the grounding position.

Because of the special arrangement of the connection pieces, a very large number of variants is possible.

Thus, for example, an isolating switch can be built in which two coaxial bulkhead flanges are provided which are located opposite each other; the connection pieces are then symmetrically located on both sides of the center line of the two bulkhead insulators.

If, in addition to the two bulkhead insulators opposite each other, a third insulator is to be provided which is positioned perpendicular to these in such a manner that two phase conductor arrangements run along one line and the third phase conductor arrangement is perpendicular to this, which leads to a T-shaped encapsulation housing, the contact point with the two connection pieces will run perpendicular to the connecting lines between the two opposite phase conductor arrangements if an isolating switch is provided in the line for the third phase conductor arrangement; the two phase conductor arrangements are then connected by means of connecting conductors which are located in one plane and the second connection piece carrying the opposite contact is then attached at a suitable point on the connecting conductors.

If, in addition, two isolating switches are also to be provided in the phase conductor lines located in one line, the first connecting pieces are aligned opposite each other, the second connection piece is disposed at a distance to these and overlapping both, the second connecting piece is attached to a further connecting piece corresponding to the first connecting piece and is associated with the phase conductor arrangement running perpendicular to the alignment of the first connecting pieces. The grounding contacts can then be attached again along the extension of the connecting lines between the drive shafts and the associated contact pieces on a flange cover. This would make it possible to switch the two phase conductor arrangements which are opposite each other simultaneously or alternately to the third phase conductor arrangement.

If two phase conductor arrangements which are opposite each other and which are in alignment with each other and a third phase conductor arrangement which runs perpendicular to the former are provided, it is desired under certain circumstances to insert an isolating switch in each case between the first phase conductor arrangement and the third phase conductor arrangement. For this purpose, the connection piece which is connected to the second phase conductor arrangement is bent; the end which is bent by 90° towards the third phase conductor arrangement more or less forming the second connecting piece for the contact point or isolating point associated with the third phase conductor arrangement. The second connecting piece for the isolating or contact point associated with the first phase conductor or the first phase conductor arrangement is additionally attached to this bent-away end in the customary manner according to the invention.

The arrangement with the bent connecting piece can also be used if the encapsulation housing itself is in the form of a 90° pipe elbow.

The same arrangement according to the invention also can be used if a cable tap is provided behind the isolator. The second connecting piece is then arranged across the cable taps in each case according to the invention.

The structure of the contact point according to the invention can therefore be used to produce any arbitrary isolating switch arrangement in which essentially the same components can be used.

Other features which are considered as characteristic for the invention are set forth in the appended claims.

Although the invention is illustrated and described herein an embodied in an isolating switch apparatus for a high-voltage switching system which may be insulated with $SF_6$ gas, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is a diagrammatic, cross-sectional view of a first embodiment of an isolator according to the invention;

FIG. 1a is a schematic circuit diagram indicating the switching position of FIG. 1;

FIG. 2 is a view similar to FIG. 1 of a second embodiment of the invention with a T-shaped arrangement;

FIG. 2a is a schematic circuit diagram indicating the switching position of FIG. 2;

FIG. 3 is another similar view of a third embodiment of the invention having a cross-shaped arrangement and two isolators;

FIG. 3a is a schematic circuit diagram indicating the switching position of FIG. 3;

FIG. 4 is a further similar view of a fourth embodiment, also having two isolators;

FIG. 4a is a schematic circuit diagram indicating the switching position of FIG. 4;

FIG. 5 is an additional cross-sectional view of a fifth embodiment in which the line is guided in a circular arc;

FIG. 5a is a schematic circuit diagram indicating the switching position of FIG. 5;

FIG. 6 is a similar view of a sixth embodiment with an isolating link;

FIG. 6a is a schematic circuit diagram indicating the switching position of FIG. 6;

Referring now to the figures of the drawings in detail and first particularly to FIG. 1 thereof, there is seen a first embodiment of an isolating link forming a closed unit. The isolator arrangement proper is accomodated in an encapsulation or casing portion 10, having two ends which terminate at flanges 12 and 14. The housing may be filled with $SF_6$ insulating gas.

Figure 7:
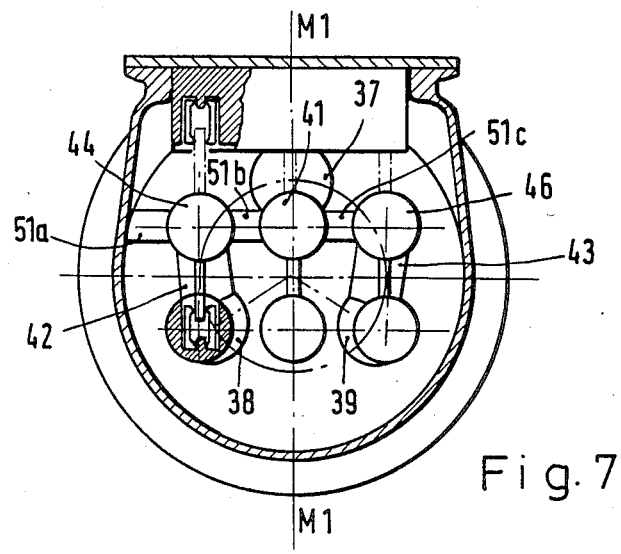
FIG. 7 is another cross-sectional view of the isolating link according to FIG. 1, rotated through 90°.

Partition or carrier insulators 26 and 28 are connected on both sides to the flanges 12 and 14 and serve as supports for inner conductors 30 and 32 indicated by broken lines. These inner conductors 30 and 32 are conventionally disposed on the corners of a triangle for three phases. Inside the encapsulation portion 10, line portions or contact point 34, 35, 36 on the right and line portions or contact points 37, 38, 39 on the left, are connected to the inner conductors 30 and 32, respectively. The line or connecting portion 37 is connected to an L-shaped line portion 40, having a long arm or first connection piece 41 which is disposed parallel to the center axis M and at a distance D from the axis M. L-shaped conductor portions 42 and 43 which can also be seen in FIG. 7, are connected to the two line or connecting portions 38 and 39. The portions 42, 43 are aligned in such a manner that their longer arms are located in the same manner as the arm 41 and are parallel to the arm 41 in the interior of the encapsulation portion 10. The arms are also disposed in a horizontal plane together with the arm 41. The arm 41 as well as other arms 44 and 46 each have a hole 48 formed therein through which an insulating material drive shaft 50, also referred to as an insulating shaft 50, is disposed. A contact blade 52 is rigidly connected to each insulating shaft 50 for each phase.

Opposite contact arms or second connection pieces 54 are connected to the line portions 34, 35 and 36 and the ends thereof have contact finger elements or contact pieces 56 which can move into contact with the contact blades 52, corresponding to the arms 41, 44 and 46.

Above the insulating drive shaft 50, a stub or socket-shaped recess 16 is provided in the encapsulation portion 10. The recess 16 ends in a flange 20 attached to a closing cover 22 for holding a grounding contact device or disconnection point 24 projecting into the interior of the encapsulation portions 10.

The position shown in FIG. 1 is the switched-on position of the isolating switch or link. When the contact blades 52 are rotated clockwise about the shaft 50, which is the direction in which the drive shaft 50 is driven, the isolating blades reach a position running parallel to the central axis of the encapsulation portion or housing 10, and the isolating switch is switched off. When the contact blades continue to move in the clockwise direction, they engage the grounding contacts 24; in this position, in which the contact blades are swung upwards through 180° in a path shown in broken lines, into a position running perpendicular to the central axis M, they are located in the grounding position or disconnection point and the isolating switch is opened. The position in which the contact blades point upwards, is the position shown in the circuit diagram of FIG. 1a.

FIG. 2 shows an isolating switch or link apparatus located in an encapsulation 60, which is installed in the train or course of a three-phase bus bar as an outgoing isolating switch. On both sides of the encapsulation, the insulators 26 and 28 are connected to flanges and carry the phase conductors 30 and 32, respectively. The individual phase conductors 30 and 32 are connected to each other by means of connecting conductors 62 which run parallel to each other in such a manner that they are located in one horizontal plane. The encapsulation 60 has an opening 64 formed therein which runs perpendicular to the horizontal central axis and which has dimensions that correspond to the flanges on the left and on the right on the encapsulation 60. An insulator 66, corresponding to the insulators 26 and 28, which supports phase conductors 33 running perpendicular to the phase conductors 32 and 30, is adjacent the opening 64. The phase conductors 33 are connected to connection parts 40', 42' and 43' and to arms which correspond to the connection parts 40, 42 and 43 as well as the arms 44 and 46. Similar to the embodiment of FIG. 1, the connection or terminal part is connected to the connecting portion or arm 41 which runs parallel thereto and perpendicular to the connecting conductors 62. Each of the connection parts have a bore 48 formed therein through which the drive shaft 50 passes. The drive shaft 50 is again connected to the contact blades 52 which can be swung from the switched-on position shown in solid lines, through the path shown in broken lines into a position in which they come into contact with a grounding contact or disconnection point 68 on the encapsulation 60.

In each case, one connection or terminal contact 70 is disposed on the connecting conductors or bars 62. The contacts 70 are located at a distance from the central axis M1 of the connecting point of the phase conductors 33 on the flange at the opening 64. In the same manner as the opposing contact arms 54, the contacts 70 are parallel to the arms 41 at a distance corresponding to the contact blade length. FIG. 2c also contains a corresponding circuit diagram.

In FIG. 3, a housing 80 is shown which, in comparison with the housing or encapsulation 60, additionally has an opening 65 which corresponds to the opening 64, which is opposite the opening 64 and which is closed by means of a closing cover 67. At the housing 80, phase-conductor connections are disposed on three sides, namely laterally and below as in the embodiment of FIG. 2. Since the construction is similar to that of FIG. 2, no details are given with respect to its construction. The horizontal phase-conductor connections are connected to arms 82 and 84 which are in alignment with each other, which end at a distance from each other, and which have bores 86 and 88 formed therein through which insulating shafts 90 and 92 pass in each case. The insulating shaft is firmly connected to contact blades 94 and 96 which can engage conductor portions 98 running parallel to arms 82 and 84. The conductor portions 98 are attached to terminal or connection parts 100 and 104, the dimensions of which correspond to the connecting parts 41, 42 . . . Grounding contacts 95 and 97 for the contact blades 94 and 96 are attached to the closing cover 67, are directly perpendicularly above the insulating material drive shafts, and hang down from the closing cover. The circuit layout can again be seen from the circuit in FIG. 3a.

FIG. 4 shows an encapsulation 61 which is similar to the encapsulation of FIG. 2 and which differs from the encapsulation 60 only by the fact that it is provided with a recess 103 that is identical to the recess 16 and is closed by a cover 105. A grounding contact 106 is provided at the inside of the cover 105 for each contact blade 107 which is attached to an insulating shaft 108. A terminal or connection part 110 for each phase is connected to the righthand insulator (corresponding to the insulator 26 of FIG. 1) in each case. As seen from the connecting point at the insulator 26, the connection parts 110 are bent away perpendicularly downward on the other side of the central axis of the insulator 66 with the phase conductor 33 (that is to say on the left-hand side in FIG. 4), so that contact blades 112, corresponding in principle to the contact blades 52, can engage with the free ends of the connecting parts 110. The free end of the connection or terminal part or conductor portion 110 is attached to a connection or terminal part 114, running parallel to the central axis M. The part 114 permits a second isolating switch to come into contact, corresponding to the isolating switch of FIG. 1. The dimensions of the housing for this embodiment correspond to the housing 60 of FIG. 2. The switching position of the FIG. 4 embodiment is shown in FIG. 4a.

In FIG. 5, another embodiment of the invention is shown. The housing is a 90° pipe elbow and carries reference numeral 120. A support insulator 122 on the right-hand side and a support insulator 124 towards the bottom are joined. The support insulator 122 is connected to terminal or connection pieces or conductor portions 126, 128 and 130. The connection piece 126 which is visible in FIG. 5 is Z-shaped whereas the other two, 128 and 130, are U-shaped. The free ends of the connection pieces 126, 128, 130 are bent away parallel to the outgoing axis A. The ends are each located at a distance from one connection part 132. The parts 132 correspond to the connection parts 41 and they are connected to the flange 124, for each phase. The insulating shaft 50 again penetrates through these connection parts and drives the contact blades 134 which can be brought into engagement with a grounding contact or disconnection point 136 corresponding to the grounding contact 168. The switching position of the FIG. 5 embodiment is shown in FIG. 5a.

The apparatus according to FIG. 6 with a housing 156 accomodating the isolating switch, is suitable for a cable tap. The ends of outgoing cables 150 and 152 are in each case connected to a connection or terminal piece 154 disposed across and above the ends of the outgoing cables 152, 150, which run perpendicularly downward. Toward the left-hand side, the housing 156 is closed with a support insulator 158 which correspond to the insulator 28. Accordingly, the construction of the left-hand connection or terminal side of FIG. 6 is developed to be identical to the left-hand connection side of the apparatus of FIG. 1. The contact blades, which were given reference numeral 52 in order to clarify this point, then come into contact with the connection part 154 for each outgoing cable 150 and 152. Toward the top, the housing 156, like that of FIG. 3, is closed with a closing cover 151. A grounding contact 153 similar to the grounding contacts 95 or 97 of FIG. 3, is attcahed to the cover 151.

In FIG. 6a, the associated circuit diagram is also shown in the same manner as in the other figures.

The opposing contacts for the contact blades are conventional finger contacts known in the art.

Figure 8:
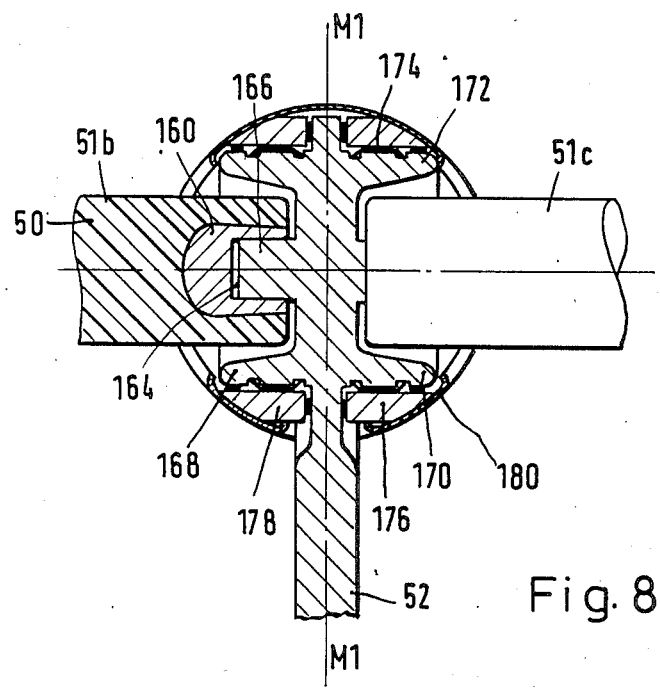
FIG. 8 is a fragmentary, partially cross-sectional view of a positive or form-locking connection between the insulating material drive shaft and a contact blade; a form-locking connection being a connection wherein the elements are held together by virtue of their shape.

FIG. 8 shows a positive or form-locking connection between the insulating material drive shaft 50 and a contact blade 52. The insulating material shaft is subdivided into a non-illustrated part connected to a drive device, and two connection parts 51$_b$, 51$_c$, located between the contact blades. FIG. 8 shows the contact blade 52 at the center, that is to say on the central axis M1—M1. Thus, the insulating material shaft in this region is formed of two parts 51$_b$ and 51$_c$. A coupling piece 160 which serves as a shield, is inserted into the free ends of the both parts.

The coupling piece 160 has a blind hole-type recess 164 formed therein, which is shaped and which is engaged by a pin 166 on the contact blade 52. The pin 166 is annularly surrounded by a circular ring-type projection 168 on the contact blade which extends on the opposite side into a circular ring-shaped extension 170, since the contact piece is symmetrical with respect to the central axis M1—M1. As seen overall, this causes a roller 172 to be formed, having outer surfaces which are connected by segmented contacts 174 to circular ring-shaped opposite contacts 176 and 178 which are surrounded by a spherical shield 180 and which are in electrically conductive contact with the connecting pieces 42, 43 and 41, respectively.

Further herein and forming a part of this application is a description of the invention in German which is the native language of the applicants.

We claim:

1. Isolating switch apparatus, comprising an encapsulation having first and second opposite sides, at least one disconnection point and a plurality of contact points corresponding to a given number of phases therein, a plurality of phase conductors at least partially disposed in said encapsulation for a plurality of phases, first and second connection pieces connected to said phase conductors in said encapsulation for each contact point of each phase, said first connection piece projecting from said first side to a given point in said encapsulation, said second connection piece projecting from said second side to a point beyond said given point causing said first and second connection pieces to be partially overlapped, mutually spaced apart and substantially mutually parallel, a contact piece disposed on said second connection piece, an insulated drive shaft passing through a hole formed through said first connection piece, said second connection piece extending beyond said drive shaft, and a contact blade attached to and rotatable by said drive shaft into a switched-on position in which said contact blade is substantially perpendicular to said first and second connection pieces, is disposed between said first and second connection pieces, and contacts said contact piece.

2. Isolating switch apparatus according to claim 1, including SF$_6$ insulating gas disposed in said encapsulation.

3. Isolation switch apparatus according to claim 1, wherein said contact piece is dispsoed a given distance from said drive shaft along an imaginary line, and including a grounding contact disposed on said encapsulation along said imaginary line at substantially said given distance from said drive shaft.

4. Isolation switch apparatus according to claim 1, wherein said first and second connection pieces are substantially symmetrically disposed on two sides of the central axis of said encapsulation.

5. Isolating switch apparatus according to claim 1, wherein said first and second connection pieces are substantially symmetrically disposed with respect to said phase conductors.

6. Isolating switch apparatus according to claim 1, wherein said phase conductors include two substantially mutually aligned phase conductors and a third phase conductor substantially perpendicular to said two phase conductors, said disconnection point being associated with said third phase conductor, and including a connecting conductor connected between said two phase conductors, said second connection piece being connected to said connecting conductor.

7. Isolating switch apparatus according to claim 1, wherein said phase conductors are in the form of two mutually aligned and opposite phase conductors and a third phase conductor perpendicular to said two mutually aligned phase conductors, said at least one disconnection point being two disconnection points associated with said two phase conductors, said second connection piece for each of said two phase conductors projecting beyond said given point causing said second conduction piece to overlap said first connection pieces, and including another connection part associated with said third phase conductor and connected to said second connection piece.

8. Isolating switch apparatus according to claim 1, wherein said phase conductors are in the form of first and second mutually aligned and opposite phase conductors and a third phase conductor perpendicular to said first and second phase conductors, said at least one disconnection point being two disconnection points associated with said first and third phase conductors, said second connection piece of said third phase conductor being a substantially L-shaped conductor portion integral with said second phase conductor, and said second connection piece of said first phase conductor being attached to said second connection piece of said third phase conductor.

9. Isolating switch apparatus according to claim 1, wherein said housing has a substantially 90° bend formed therein, said phase conductors include two mutually perpendicular phase conductors, and including a conductor portion bent through substantially 90°; said second connection piece of one of said phase conductors being integral with the end of said 90°-bent conductor portion.

10. Isolating switch apparatus according to claim 1, including a cable tap device perpendicular to one of said phase conductors having cables entering said encapsulation, said second connection piece being perpendicular to and attached to said cables.

11. Isolating switch apparatus, comprising an encapsulation having at least one disconnection point and a plurality of contact points corresponding to a given number of phases therein, a plurality of phase conductors at least partially disposed in said encapsulation for a plurality of phases, first and second connection pieces connected to said phase conductors in said encapsulation for each contact point of each phase, said first and second connection pieces being partially overlapped, mutually spaced apart and substantially mutually parallel, a contact piece disposed on said second connection piece, an insulated drive shaft passing through a hole formed through said first connection piece, said drive shaft being overlapped by said second connection piece, and a contact blade attached to and rotatable by said drive shaft into a switched-on position in which said contact blade is substantially perpendicular to said first and second connection pieces, is disposed between said first and second connection pieces, sand contacts said contact piece, said contact blade having shaped pins integral with two sides thereof, said drive shaft being divided, and said pins being engaged in shaped recesses formed in said drive shaft matching said pins.

12. Isolating switch apparatus according to claim 11, including an annular collar surrounding said pins and having an outer surface forming a roller, and sliding contacts carrying said roller in a recess formed in said first connection piece.

13. Isolating switch apparatus according to claim 11, wherein said divided drive shaft has two parts, said shaped recesses are formed in ends of said divided drive shaft, and including shielding elements embedded in said parts of said drive shaft surrounding said shaped recesses.

14. Isolating switch apparatus according to claim 12, wherein said divided drive shaft has two parts, said shaped recesses are formed in ends of said divided drive shaft, and including shielding elements embedded in said parts of said drive shaft surrounding said shaped recesses.

* * * * *